US008542808B2

(12) United States Patent
Tysowski et al.

(10) Patent No.: US 8,542,808 B2
(45) Date of Patent: *Sep. 24, 2013

(54) CONTACT IMAGE SELECTION AND ASSOCIATION METHOD AND SYSTEM FOR MOBILE DEVICE

(75) Inventors: Piotr Tysowski, Waterloo (CA); Earl Wikkerink, Waterloo (CA); Stuart Pollock, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/097,436

(22) Filed: Apr. 29, 2011

(65) Prior Publication Data

US 2011/0206278 A1 Aug. 25, 2011

Related U.S. Application Data

(63) Continuation of application No. 11/465,512, filed on Aug. 18, 2006, now Pat. No. 7,949,113.

(60) Provisional application No. 60/807,395, filed on Jul. 14, 2006.

(51) Int. Cl.
*H04M 1/56* (2006.01)
*H04M 3/42* (2006.01)

(52) U.S. Cl.
USPC ...................................... 379/142.04; 455/415

(58) Field of Classification Search
USPC .................. 379/265.02–266.01; 455/426.2
See application file for complete search history.

(56) References Cited

U.S. PATENT DOCUMENTS

| | | | | |
|---|---|---|---|---|
| 5,889,852 | A | * | 3/1999 | Rosecrans et al. ........ 379/355.05 |
| 7,302,254 | B2 | * | 11/2007 | Valloppillil ................ 455/414.1 |
| 2004/0207722 | A1 | | 10/2004 | Koyama et al. |
| 2005/0143124 | A1 | | 6/2005 | Kennedy |
| 2006/0041590 | A1 | * | 2/2006 | King et al. .................. 707/104.1 |
| 2006/0041603 | A1 | * | 2/2006 | Paterson et al. ............... 707/204 |
| 2006/0087559 | A1 | * | 4/2006 | Huberman et al. ........ 348/207.1 |

FOREIGN PATENT DOCUMENTS

| | | |
|---|---|---|
| EP | 0762775 | 3/1997 |
| EP | 1403823 | 3/2004 |
| WO | 2004040461 | 5/2004 |

OTHER PUBLICATIONS

Javatek Media, PhonePix: Photo Caller ID version 6, Four (4) pages
User Manual: PhonePix: Photo Caller ID, Javatek Media, Ten (10) pages http://javatekmedia.com/phonepix/product.jsp.
My5 Client Product Requirements Document, Version 1.0, Dec. 1, 2005, 55 pages, Author T-MOBLE Product Development (S.A., E.W., J.C., E.O.).
Extended European Search Report issued on Apr. 17, 2009 in connection with the corresponding EP Application No. 06790546.3.

* cited by examiner

*Primary Examiner* — Mohammad Islam
(74) *Attorney, Agent, or Firm* — Rowand LLP

(57) ABSTRACT

A method and computing device for encoding an image according to a preset encoding parameter for the image. The encoding producing an encoded image having a file size. If it is determined that the file size exceeds a maximum file size and the encoding parameter does not meet a threshold, the encoding parameter is modified. The encoding, determining and modifying are repeated until the file size does not exceed a maximum file size or the encoding parameter meets the threshold.

16 Claims, 6 Drawing Sheets

CONTACT IMAGE SELECTION AND ASSOCIATION METHOD AND SYSTEM FOR MOBILE DEVICE

CROSS-REFERENCE TO RELATED APPLICATIONS

The present application is a continuation of U.S. non-provisional patent application Ser. No. 11/465,512 filed Aug. 18, 2006 and claims priority to U.S. provisional patent application Ser. No. 60/807,395 filed Jul. 14, 2006, each owned in common herewith.

FIELD

The present application relates to image selection for contact records and, in particular, a method and apparatus for selecting and associating an image with a contact record on a mobile device.

BACKGROUND

Many application programs, especially those involving communications-related functions, provide an address book or contacts feature. This feature allows users to input contact information for individuals, including name, title, company, address, phone numbers, e-mail addresses, etc., and save the information as a contact record. For example, current versions of Microsoft Outlook™ from Microsoft Corporation include a contacts application for storing contact records.

Some contact applications allow the user to store an image associated with the contact. This allows the user to store, for example, a photograph of the individual whose information is detailed in the contact record in association with the contact record. The image may be stored in a field within the contact record and/or stored as an attachment to the contact record.

The association of an image with a contact record can be useful for many applications, especially those relating to communications. For example, in a voice call application, upon receiving an incoming call, the user contact record may be displayed as part of a "caller ID" function, including the associated image of the user. This allows the recipient of the call to quickly visually identify the source of the incoming call. The image may similarly be displayed in association with e-mail, instant messaging, or other communications, to give a visual cue to the user regarding the identity of the other party to the communication.

Communications activities and applications are particularly relevant to mobile devices. Accordingly, the association of image data and contact records may be of particular use in the context of mobile devices. However, mobile devices differ from desktop computers and the like in that they have limited storage and processing capacity and a heightened concern with conserving battery power and minimizing bandwidth usage in wireless communications. Detailed images present a challenge to mobile devices in that regard.

Accordingly, it would be advantageous to provide for a method and apparatus for image selection and association with a contact record in the context of a mobile device.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present disclosure provides a computer-implemented method for encoding an image. The method comprises setting an encoding parameter for the image, encoding the image according to the encoding parameter to produce an encoded image having a file size, determining that the file size exceeds a maximum file size and that the encoding parameter does not meet a threshold and, in response, modifying the encoding parameter, and repeating the encoding, determining, and modifying until the file size does not exceed a maximum file size or the encoding parameter meets the threshold.

In another aspect, the present disclosure provides a computing device for encoding an image. The device comprises a memory containing at least one image file containing image data for rendering an image, and an image encoder for receiving selection of a sub-image selected from the image and encoding the sub-image according to an encoding parameter to produce a sub-image file, wherein the image encoder is configured to incrementally modify the encoding parameter and re-encode the sub-image with the modified encoding parameter until a file size of the sub-image file exceeds a maximum file size or the encoding parameter meets a threshold.

A computer program product comprising a tangible machine-readable medium having encoded thereon computer-readable instructions executable by a processor for causing a computing device to encode an image. The computer-readable instructions comprising instructions for setting an encoding parameter for the image, instructions for encoding the image according to the encoding parameter to produce an encoded image having a file size, instructions for determining that the file size exceeds a maximum file size and that the encoding parameter does not meet a threshold and, in response, modifying the encoding parameter, and instructions for repeating the encoding, determining, and modifying until the file size does not exceed a maximum file size or the encoding parameter meets the threshold.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

Figure 1:
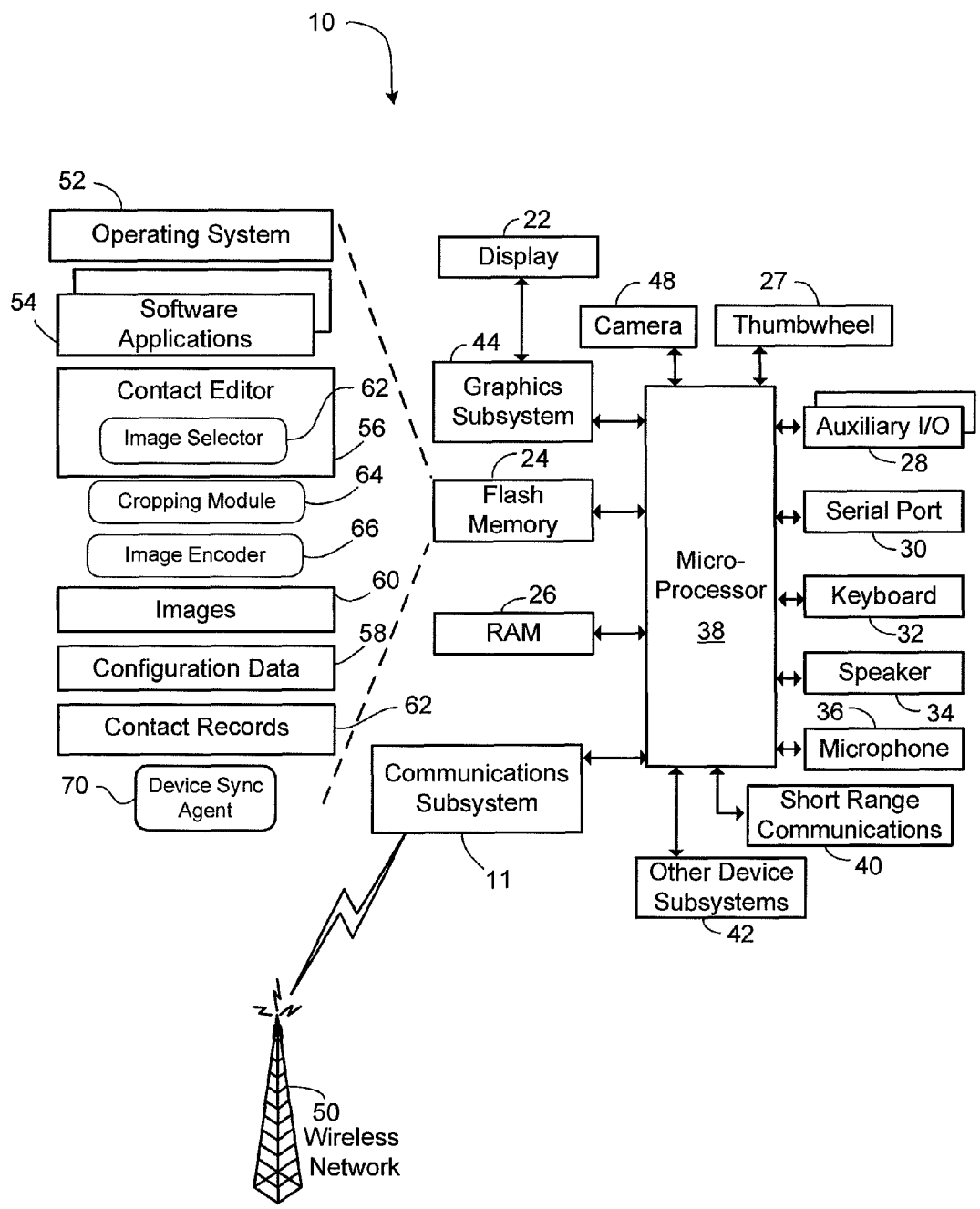
FIG. 1 shows a block diagram of an example embodiment of a mobile device.

Referring now to the drawings, FIG. 1 is a block diagram of an example embodiment of a mobile device 10. In some embodiments, the mobile device 10 is a two-way, electronic communications device having data and possibly also voice communication capabilities. In at least one example embodiment, the mobile device 10 has the capability to exchange messages with other devices and computer systems. Depending on the functionality provided by the mobile device 10, in various embodiments the mobile device 10 may be a multiple-mode communication device configured for both data and voice communications, a smartphone, a personal digital assistant enabled for wireless communication, or a mobile computer system enabled for wireless communication, among other things.

The device 10 includes a communication subsystem 11. In one embodiment, the communication subsystem 11 may include a receiver, a transmitter, and associated components such as one or more antenna elements, and a processing module such as a digital signal processor (DSP). As will be apparent to those skilled in the field of communications, the particular design of the communication subsystem 11 will be dependent upon the communication network in which the device 10 is intended to operate.

Signals received by the device 10 from a wireless communication network 50 are input to the receiver of the communication subsystem 11, which may perform such common receiver functions as signal amplification, frequency down-conversion, filtering, channel selection and the like. In a similar manner, signals to be transmitted are processed, including modulation and encoding for example, by the DSP and input to the transmitter for digital-to-analog conversion, frequency up-conversion, filtering, amplification and transmission over the wireless communication network 50.

The device 10 includes a microprocessor 38 that controls the overall operation of the device. The microprocessor 38 interacts with the communications subsystem 11 and also interacts with further device subsystems such as a graphics subsystem 44, flash memory 24, random access memory (RAM) 26, thumbwheel 27, auxiliary input/output (I/O) subsystems 28, serial port 30, keyboard or keypad 32, speaker 34, microphone 36, a short-range communications subsystem 40, and any other device subsystems generally designated as 42. The graphics subsystem 44 interacts with the display 22 and renders graphics and/or text upon the display 22. The mobile device 10 may include a camera 48 and related software for capturing images, which then may be subsequently stored in the flash memory 24.

Operating system software 52 and various software applications 54 executed by the microprocessor 38 are, in one example embodiment, stored in a persistent store such as flash memory 24 or similar storage element. Those skilled in the art will appreciate that the operating system 52, software applications 54, or parts thereof, may be temporarily loaded into a volatile store such as RAM 26.

The microprocessor 38, in addition to its operating system functions, enables execution of software applications 54 on the device. A predetermined set of software applications 54 which control basic device operations, including data and voice communication applications for example, will normally be installed on the device 10 during manufacture. Further software applications 54 may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38.

In a data communication mode, a received signal such as a text message or Web page download will be processed by the communication subsystem 11 and input to the microprocessor 38, which will further process the received signal for output to the display 22 through the graphics subsystem 44, or alternatively to an auxiliary I/O device 28. A user of device 10 may also compose data items within a software application 54, such as email messages for example, using the keyboard 32 in conjunction with the display 22 and possibly the thumbwheel 27 or another auxiliary I/O device 28 such as, for example, a touchpad or trackball. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless mobile network 50 is, in an example embodiment, a wireless packet data network, (e.g. Mobitex™ or DataTAC™), which provides radio coverage to mobile devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some embodiments, the wireless mobile network 50 may comprise an IEEE 802.11 (WiFi) network, iDEN (Integrated Digital Enhanced Network), EvDO (1× Evolution-Data Optimized) network, or HSDPA (High-Speed Downlink Packet Access) network. It will be appreciated that the wireless mobile network 50 may be any other type of wireless network for providing the device 10 with connectivity to remote networks.

Figure 2:
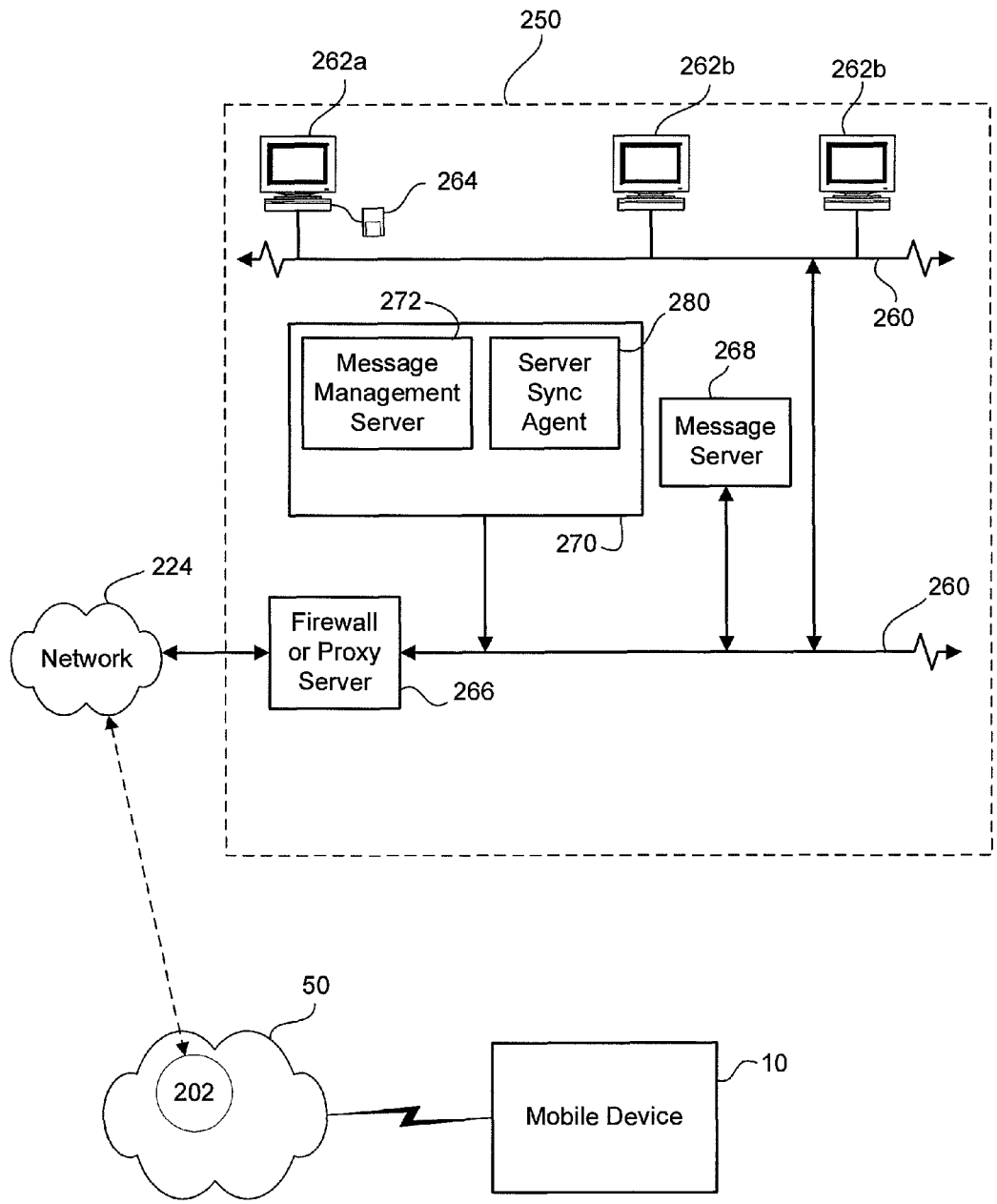
FIG. 2 shows a block diagram of an example embodiment of a host system.

Reference is now made to FIG. 2, which shows a block diagram of an example embodiment of a host system 250. Host system 250 may be a corporate office or other local area network (LAN), or may instead be a home office computer or some other private system, for example. In this example, host system 250 is depicted as a LAN of an organization to which a user of mobile device 10 belongs.

Host system 250 comprises a number of network components connected to each other by way of the LAN. For instance, a user's desktop computer 262a with an accompanying cradle 264 for the user's mobile device 10 is situated on host system 250. Cradle 264 for mobile device 10 may be coupled to computer 262a by a serial or a Universal Serial Bus (USB) connection, for example. Other user computers 262b are also situated on host system 250, and each may or may not be equipped with an accompanying cradle 264 for a mobile device. Cradle 264 facilitates the exchange of information between user computer 262a to mobile device 10, and may be particularly useful for bulk information updates often performed in initializing mobile device 10 for use. It will be apparent that such exchange of information can also be facilitated through other types of short-range communication connections, such as an infrared or Bluetooth™. It will also be understood by persons skilled in the art that user computers 262a, 262b will typically be also connected to other peripheral devices not explicitly shown in FIG. 2.

Furthermore, only a subset of network components of the host system 250 are shown in FIG. 2 for ease of exposition, and it will be understood by persons skilled in the art that the host system 250 may comprise additional components not explicitly shown. More generally, the host system 250 may represent a smaller part of a larger network of the organization, and may comprise different components and/or be arranged in different topologies than that shown in the example of FIG. 2.

In this example, mobile device 10 communicates with the host system 250 through a node 202 of wireless network 50 and a shared network infrastructure 224 such as a service provider network or the public Internet. Access to the host system 250 may be provided through one or more routers, and computing devices of the host system 250 may operate from behind a firewall or proxy server 266.

In a variant implementation, the host system 250 comprises a wireless VPN router (not shown) to facilitate data exchange between the host system 250 and the mobile device 10. A VPN connection may be a Transmission Control Protocol (TCP)/IP or User Datagram Protocol (UDP)/IP connection to deliver the messages directly to mobile device 10 in this variant implementation.

Data messages intended for a user of mobile device 10 are initially received by a message server 268 of the host system 250. Such messages may originate from any of a number of sources. For instance, a message may have been sent by a sender from a computer 262b within host system 250, from a different mobile device (not shown) connected to wireless network 50 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, the host system 250 may include multiple message servers 268. Message server 268 may also be adapted to provide additional functions beyond message management, including the management of data associated with calendars and task lists, for example. The message server 268 may manage data associated with a set of contacts for each user account. Each set of contacts may include a plurality of contact records detailing the contact information for individuals. A typical contact record may include fields relating to an individual's name, address, title, organization, phone number(s), facsimile number(s), e-mail addresses, and other details. In embodiments of the present application, the contact records are further capable of containing a field for an image associated with the contact. In typical usage, the image in an individual's contact record would be a photograph of the individual, but the present application is not restricted to this use.

When messages are received by message server 268, they are typically stored in a message store, from which messages can be subsequently retrieved and delivered to users. For instance, an e-mail client application operating on a user's computer 262a may request the e-mail messages associated with that user's account stored on message server 268. These messages may then be retrieved from message server 268 and stored locally on computer 262a.

When operating mobile device 10, the user may wish to have e-mail messages retrieved for delivery to the handheld. An e-mail client application operating on mobile device 10 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 10 is assigned its own e-mail address, and messages addressed specifically to mobile device 10 are automatically redirected to mobile device 10 as they are received by message server 268.

To facilitate the wireless communication of messages and message-related data between mobile device 10 and components of the host system 250, a number of wireless communications support components 270 may be provided. In this example implementation, wireless communications support components 270 include a message management server 272, for example. Message management server 272 is used to specifically provide support for the management of messages, such as e-mail messages, that are to be handled by mobile devices 10. Generally, while messages are still stored on message server 268, message management server 272 can be used to control when, if, and how messages should be sent to the mobile device 10. Message management server 272 also facilitates the handling of messages composed on the mobile device 10, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 10; compress and encrypt new messages (e.g. using an encryption technique such as Data Encryption Standard (DES) or Triple DES) and push them to mobile device 10 via the shared network infrastructure 224 and wireless network 50; and receive messages composed on mobile device 10 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by mobile device 10 can be defined (e.g. by an administrator in accordance with IT policy) and enforced by message management server 272. These may include whether mobile device 10 may receive encrypted and/or signed messages, minimum encryption key sizes, whether outgoing messages must be encrypted and/or signed, and whether copies of all secure messages sent from mobile device 10 are to be sent to a pre-defined copy address, for example.

Message management server 272 may also be adapted to provide other control functions, such as only pushing certain message information or pre-defined portions (e.g. "blocks") of a message stored on message server 268 to the mobile device 10. For example, when a message is initially retrieved by the mobile device 10 from the message server 268, the message management server 272 is adapted to push only the first part of a message to the mobile device 10, with the part being of a pre-defined size (e.g. 2 KB). The user can then request more of the message, to be delivered in similar-sized blocks by the message management server 272 to the mobile device 10, possibly up to a maximum pre-defined message size.

Accordingly, the message management server 272 facilitates better control over the type of data and the amount of data that is communicated to the mobile device 10, and can help to minimize potential waste of bandwidth or other resources.

It will be understood by persons skilled in the art that the message management server 272 need not be implemented on a separate physical server in the host system 250 or other network. For example, some or all of the functions associated with the message management server 272 may be integrated with the message server 268, or some other server in the host system 250. Furthermore, the host system 250 may comprise multiple message management servers 272, particularly in variant implementations where a large number of mobile devices 10 need to be supported.

The wireless communications support components 270 may include server sync agent 280 which manages synchronization of data between the mobile device 10 and the message server 268, as will be described in greater detail below.

Referring again to FIG. 1, the mobile device 10 may include contact records 62. The contact records 62 stored on the device 10 correspond to the contact records stored by the message server 268 of the host system 250 in association with the user of the device 10. Each contact record 62 may include fields relating to an individual's name, address, title, organization, phone number(s), facsimile number(s), e-mail addresses, and other details. In embodiments of the present application, the contact records 62 are further capable of containing a field for an image associated with the contact information.

The mobile device 10 also includes a contact editor 56 for adding, deleting, or modifying individual contact records 62. The contact editor 56 provides a user interface through which a user may create a new contact record, delete an existing contact record, and/or modify the contents of a contact record. Changes made to a contact record 62 through the contact editor 56 are saved to flash memory 24. The contact editor 56 includes an image selector 62 for adding an image to a contact record 62.

The mobile device 10 also includes images 60 stored in memory, such as the flash memory 24. The images 60 may include images pre-loaded onto the device 10 at manufacture or provisioning. The images 60 may include images received by the mobile device 10 as attachments to an electronic message or other communication over the wireless network 50. The images 60 may include images obtained by the user via a web browser from one or more web pages on the Internet. The images 60 may include images captured by the camera 48. Other sources for the images 60 will be appreciated by those of ordinary skill in the art.

The images 60 may be stored in a variety of file formats. Some of the more common image file formats include JPEG, GIF, TIFF and BMP.

The mobile device 10 may further include a cropping module 64, which provides a user interface for selecting a portion of an image and saving the selected portion as a sub-image. It may also include an image encoder 66 for encoding an image in accordance with one or more file formats. For example, the image encoder 66 may encode images in the JPEG file format, or in other image file formats. The cropping module 64 and image encoder 66 will be described in greater detail below.

The mobile device 10 also includes a device sync agent 70. The device sync agent 70 acts in concert with the server sync agent 280 (FIG. 2) to perform a synchronization process to update the records of the host system 250 and/or the device 10 in response to modifications to the records maintained on both. For example, if a contact record 62 is changed on the mobile device 10, the device sync agent 70 initiates the synchronization process to update the corresponding contact record stored on the host system 250. In this example, the device sync agent 70 sends the updated contact record, or at least the modified or added information, to the server sync agent 280. In one example, the mobile device 10 sends a newly added or selected image associated with the contact record to the host system 250 over the wireless network 50. This may be referred to as an over-the-air (OTA) sync operation. For the sake of brevity, the synchronization process is not discussed in any further detail in this application. Those of ordinary skill in the art will appreciate the steps and functional operations involved in the synchronization process. The synchronization process is performed in the background and is transparent to the user.

To minimize the battery power used, storage space required, and the bandwidth consumed in an OTA sync operation, the host system 250 may impose restrictions on the file size of images that are used in association with contact records 62. These restrictions, such as a maximum file size, and other such administrative policies, such as the maximum dimensions of the image, may be set by the host system 250 and distributed to the mobile device 10 over the wireless network 50 to be stored as configuration data 58 on the device 10. The image selector 62, cropping module 64, and/or image encoder 66 may read the configuration data 58 and operate within the bounds of policies or limitations imposed by the configuration data 58. For example, one or more of these elements may prevent the selection and association of an image with a contact record 62 if the image exceeds a pre-defined file size, and/or the selected image may be re-encoded by the image encoder 66 with reduced quality factor or colour depth so as to reduce its file size to conform to the limitations established by the configuration data 58. Based on the maximum dimensions defined in the configuration data 58, the cropping module 64 may determine the preferred aspect ratio for the image.

Figure 3:
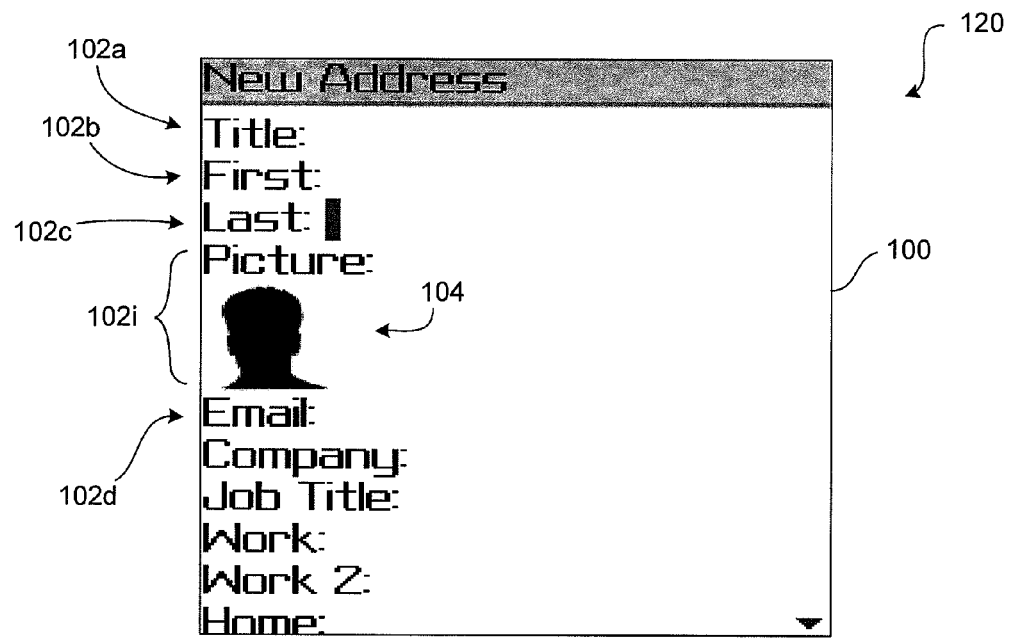
FIG. 3 diagrammatically illustrates a user interface displaying a contact record.

Reference is now made to FIG. 3, which diagrammatically illustrates an example embodiment of a contact record 100 as viewed through a user interface 120. The contact record 100 includes a number of fields, including a title field 102*a*, name fields 102*b* and 102*c*, and an email field 102*d*, among others. The contact record 100 further includes a picture field 102*i*. The picture field 102*i* contains an image 104. In the example illustrated in FIG. 3, the user has not selected and associated a particular image with this contact record 100, so the picture field 102*i* contains a default placeholder image 104. The contact record 100 may be viewed through a communications-based software application 54, such as an e-mail program, or voice call program, that provides the option of viewing contact information. This option enables a user to quickly consult a contact record in order to initiate an e-mail or voice call, as the case may be. In another embodiment, the communications-based software application 54 may employ the contact editor 56 to display contact records to a user.

Figure 4:
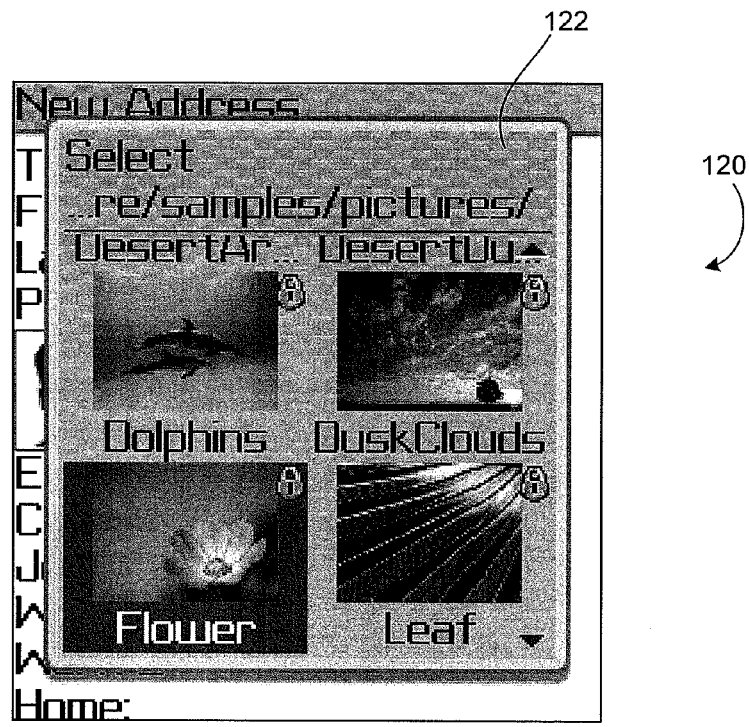
FIG. 4 diagrammatically shows the user interface displaying available images for selection.

Through the contact editor 56 (FIG. 1), which in some embodiments may be called by or may be incorporated within one or more software applications 54 (FIG. 1), the user may modify a new or existing contact record. For example, the user may select an image to incorporate into the picture field 102*i*. Reference is made to FIG. 4, which diagrammatically illustrates the user interface 120 from FIG. 3 in an image selection mode. In this mode, images 60 (FIG. 1) stored on the device 10 (FIG. 1) may be displayed to the user. In one embodiment, as illustrated, the available images stored on the device are shown in thumbnail format tiled in a scrollable window 122. It will be appreciated that other methods of showing the available images may be used, including a listing of file names.

Using an input device, such as the thumbwheel 27, the keyboard 32, or a stylus, or other device, the user may select one of the available images 60 for association with the contact record being edited.

In another embodiment, when editing a contact record using the contact editor 56 the image selector 62 may enable the user to switch to a camera mode of operation. In the camera mode of operation, the camera application software is invoked, bringing up a viewfinder on the display screen 22 (FIG. 1). The user may then capture an image using the camera 48 on the mobile device 10, and the captured image is saved in memory, like flash memory 24 (FIG. 1) or RAM 26 (FIG. 1). The device 10 may then switch back to the contact editor 56, whereupon the newly captured and saved image is automatically selected for association with the contact record.

The contact record may require that an image have a particular size (dimensions), aspect ratio, and/or maximum colour depth, along with other parameters. These requirements may be preset by the host system 250 (FIG. 2) and communicated to the device 10 and contained in the configuration data 58 (FIG. 1). It will be appreciated that many of the images 60 stored on the device 10 will not already have the appropriate size, aspect ratio, and/or colour depth for use as a contact image in a contact record. Accordingly, the image selector 62 and/or image encoder 66 may manipulate the selected image.

In one embodiment, the imposition of an aspect ratio or maximum dimensions upon the image may be achieved by distorting the full image to conform to the aspect ratio requirements, i.e. stretch or compress the image to fit the prescribed aspect ratio. In another embodiment, the aspect ratio may be imposed on the image by adding whitespace or bars at the sides of an image along one dimension to pad it to the aspect ratio; however, this results in a wasted portion of the image space. In yet another embodiment, the aspect ratio and/or maximum dimensions may be imposed upon the image by cropping or cutting away a portion of the image such that the remaining portion respects the predefined aspect ratio. This latter approach avoids distortion of the image. Moreover, by cropping the image to select a sub-image, a more relevant portion of the image may be selected that better corresponds to the contact record. For example, the selected image may be a group picture of multiple individuals. Through the cropping module 64 (FIG. 1) of the present application, a portion or sub-image may be selected from the group picture that includes, for example, the individual corresponding to the contact record being edited.

Upon selection of the desired image file by the user, the image selector 62 passes the selected image to the cropping module 64. In some implementations, this may include invoking or calling the cropping module 64 and passing the image file name as an argument. In some embodiments it may further involve converting the image from one format to another. For example, the cropping module 64 may operate using images in bitmap format. An image selected by the user that is in another format, such as JPEG, may require conversion. The image encoder 66 may also include a decoder component for decoding images and/or converting them to bitmap format images.

Figure 5:
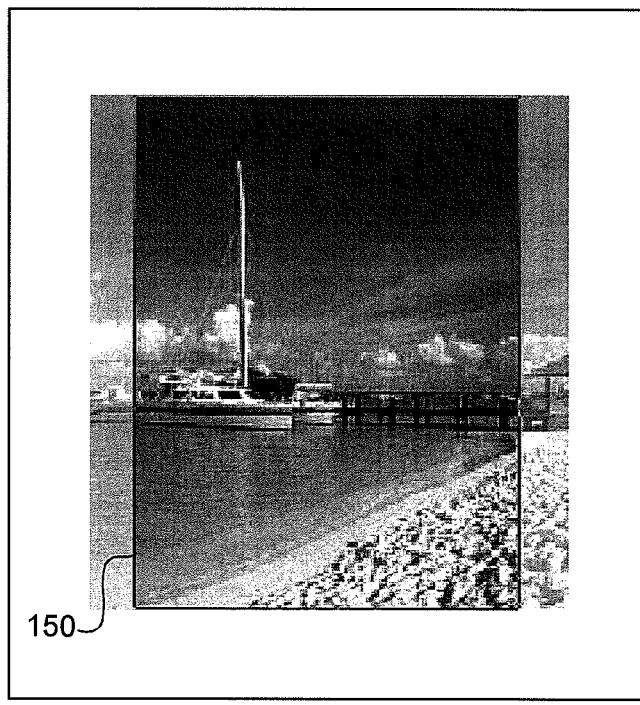
FIG. 5 diagrammatically illustrates the user interface displaying a selected image with a cropping rectangle.

Reference is now made to FIG. 5, which shows the user interface 120 in a cropping mode. The selected image is rendered on the display screen 22 and is overlaid with a cropping rectangle 150. The dimensions of the cropping rectangle 150 may be determined, in part, by the maximum dimensions defined in the configuration data 58 (FIG. 1). From these dimensions, the cropping module 64 may determine the preferred aspect ratio. For example, the server may specify a portrait or landscape format image having particular width-height dimensions. The cropping rectangle 150 may adhere to that restriction. In the initial view, the cropping rectangle 150 is centered within the display screen. In one embodiment, the cropping rectangle is dimensioned to be about 75% of the screen, in height or width (or both if the aspect ratios of the rectangle 150 and the screen 22 happen to coincide). It will be appreciated that, in other embodiments, the cropping shape may take other geometric forms than a rectangle.

In the initial default view, the image may be displayed in a full-screen view, depending on its size. For example, if the image is larger, i.e. has a greater number of pixels in either dimension, than can be displayed fully on the screen, then the cropping module 64 (FIG. 1) resizes the image to fit within the display screen 22. In other words, the image is "zoomed out" to fit within the screen dimensions.

If, however, the full image is smaller than the size of the predetermined maximum dimensions, then the cropping module 64 resizes the image to be at least as large as the dimensions of the cropping rectangle 150. This is the situation illustrated in FIG. 5, wherein the image has been resized to be the same height as the cropping rectangle 150.

The cropping module 64 allows the user to zoom in, zoom out, and move the position of the cropping rectangle 150 within the image, i.e. pan up/down or left/right. In one embodiment, the cropping module 64 responds to input signals from the thumbwheel 27, trackball, and/or keyboard 32 to change the position of the cropping rectangle 150 within the image. In one embodiment, portions of the image outside of the cropping rectangle 150 are rendered in a paler set of colours to assist the user in identifying the boundaries of the cropping rectangle 150 and to visually reinforce the fact that the image data outside the rectangle is not included in the sub-image.

Figure 6:
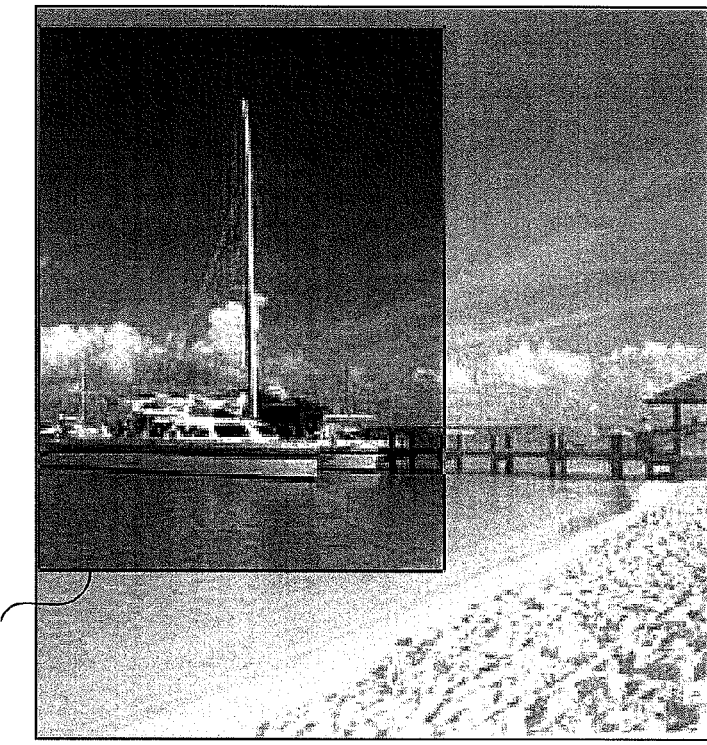
FIG. 6 diagrammatically illustrates the user interface displaying a selected image with the cropping rectangle after user manipulation.

When the user "zooms in", the bitmap image is resized to be enlarged. The resulting image may often be larger than can be displayed within the display screen 22, resulting in some portions of the edges of the image not being displayed. In this condition, if the user pans left or right, then the cropping module 64 moves the image within the display screen 22 and maintains the cropping rectangle 150 in the center of the display screen 22. If an edge of the image reaches the edge of the display screen 22, then further panning in the direction of the edge of the image will result in movement of the cropping module 150 to the edge of the screen. FIG. 6 illustrates this situation, wherein an image is shown zoomed in to a full screen view. The image has been panned such that its leftmost and uppermost edges are at the leftmost and uppermost edges of the display screen 22. Further panning in that direction has resulted in shifting of the cropping rectangle 150 to the upper left.

When the user "zooms out", the bitmap image is resized to be smaller. The resulting image, through successive "zooming out" operations, may end up smaller than the pixel size of the display screen, as shown in FIG. 5. In one embodiment, the cropping module 64 may be configured to prevent the image from being "zoomed out", i.e. shrunken, smaller than a dimension of the cropping rectangle 150. In other embodiments, the cropping module 64 may permit the image to be "zoomed out" such that it is smaller than the cropping rectangle 150.

If the user is satisfied with the portion of the image positioned in the cropping rectangle 150, then the user may input a crop command. In response to the crop command, the cropping module 64 saves or stores the portion of the image defined by the cropping rectangle, i.e. the sub-image, in bitmap form. The sub-image may be stored in RAM 26 (FIG. 1), flash memory 24 (FIG. 1), or in another volatile or temporary storage element.

In another embodiment, the cropping module 64 does not necessarily enforce the aspect ratio shown by the cropping rectangle 150. For example, if an image is sufficiently "zoomed out" such that whitespace left at the edges of the image within the cropping rectangle 150, then the whitespace may not be included in the resulting sub-image resulting in an image having a different aspect ratio than the cropping rectangle 150.

In yet another embodiment, the cropping module 64 may provide for an adjustable cropping rectangle 150. In other words, the user may be permitted to change the dimensions of the cropping rectangle 150 so as to select a very particular sub-image. In yet a further embodiment, the cropping module 64 may allow a user defined cropping shape, which is not necessarily rectangular. In some such embodiments, the user may be permitted to manually define or draw the cropping shape using an input device such as a stylus, or other such device.

Once the sub-image or portion of the image defined by the cropping rectangle 150 has been selected and saved by the cropping module 64, the image encoder 66 may be called or invoked to encode the sub-image in accordance with the requisite format.

The image encoder 66 may encode the sub-image using any of a number of image formats, including lossy image formats, such as JPEG, or loss-less image formats, such as GIF. The format may depend on the image formats acceptable to the messaging system used at the host system 250. For example, current versions of the Microsoft Outlook™ system from Microsoft Corporation permit images with the following file format extensions: .bmp, .emf, .ico, .icon, .jpg, .jpeg, .gif, .png, .tif, .tiff, and .wmf. The host system 250 may define the default format via the configuration data 58. In some embodiments, the default format is established by virtue of the fact the image encoder 66 is pre-configured to encode images in a predefined image format. In at least one embodiment, the image encoder 66 employs lossy JPEG format encoding.

The configuration data 58 may specify encoding restrictions or limitations for the image encoder 66. For example, in one embodiment, the configuration data 58 may set a maximum file size for the sub-image. In another embodiment, the configuration data 58 may set a default image size. In yet another embodiment, the configuration data 58 may establish a minimum image "quality factor" for a lossy image format. In this context, the term "quality factor" is intended to refer to the "lossiness" of the image encoding, i.e. the degree of quantization in the encoding process. In other words, the lower the quality factor, the more aggressive the compression and the greater the loss of image data during encoding. In another embodiment, the configuration data 58 may establish a minimum colour depth for a loss-less image format. The term "colour depth" refers to the colour palette size, i.e. the number of colours used to render the image. Other parameters and limitations that may be defined will be appreciated by those of ordinary skill in the art.

In the present embodiment, the configuration data 58 sets a sub-image size and aspect ratio, e.g., in one case, 96 pixels by 72 pixels in a portrait format. Based on this data, the cropping module 64 ensures that the selected sub-image respects the 96×72 portrait aspect ratio. The image encoder 66 may then scale the sub-image down to the 96×72 pixel size specification. In some embodiments, the scaling of the sub-image may be implemented within image selector 62 or cropping module 64.

Figure 7:
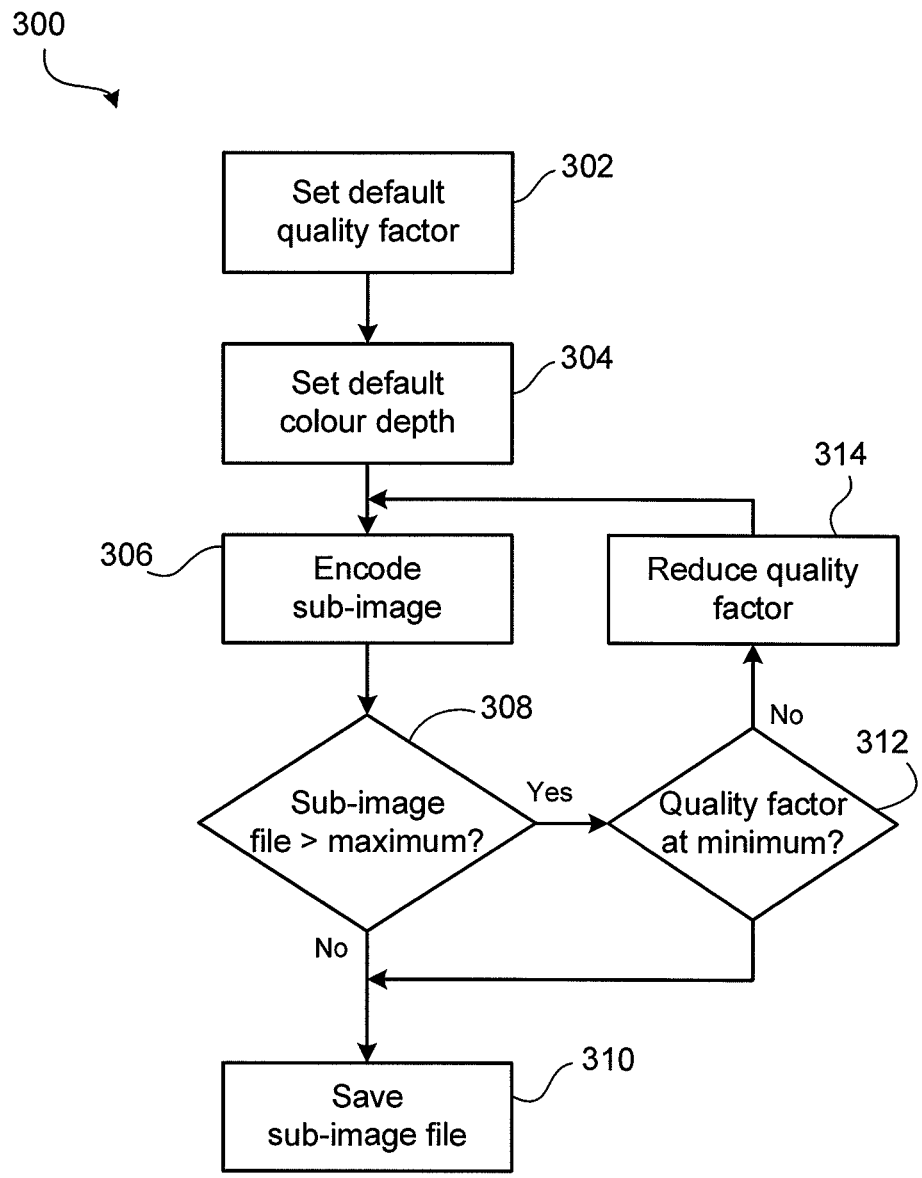
FIG. 7 shows, in flowchart form, an example method for encoding an image for association with a contact record on a mobile device.

With the sub-image having been cropped to the predefined aspect ratio and scaled to the predefined image size, the image encoder 66 may then encode the sub-image in the desired format. Reference is now made to FIG. 7, which shows, in flowchart form, a method 300 of encoding a sub-image for association with a contact record. The method 300 described below assumes an embodiment in which the sub-image is being encoded in a lossy image format, such as JPEG.

The method 300 begins in step 302 where the quality factor for encoding is set to a default quality factor. The default quality factor may be specified in the configuration data 58 (FIG. 1) on the mobile device 10 (FIG. 1). For example, in the context of JPEG encoding, the default quality factor may be set to a numerical value that reflects the degree of lossy compression in the encoding process. A lower quality factor results in a smaller file, but a greater degree of artifacts in the degraded image. In one embodiment, the default quality factor may be set to an "average" quality setting of, for example, between 50 and 75 on a 0 to 100 scale. Initially, the default quality factor may be set to the high end of the average scale, e.g. at about 75. The scale may vary depending on the specific type of JPEG encoder/compression algorithm.

In step 304, the colour depth for encoding may be set to a default colour depth. The variable "colour depth" may refer to a bit depth for determining the colour palette size. For example, in one embodiment, the colour depth is set to 16, which results in a colour palette of size $2^{16}$, or 65536 colours. Other settings may be used. The default colour depth may be specified in the configuration data 58. As noted previously, the colour depth variable may be of particular use in connection with loss-less image format encoding.

In step 306, the image encoder 66 (FIG. 1) performs the encoding of the sub-image and produces a sub-image file. For example, in the present embodiment, the resulting file is a JPEG format file. The encoding is performed using the default quality factor and default colour depth set in steps 302 and 304.

Following encoding of the sub-image in step 306, in step 308 the size of the resulting sub-image file is evaluated against a maximum sub-image file size. The maximum sub-image file size may be set in the configuration data 58. To reduce the amount of wireless data traffic for OTA sync operations, the size of the images associated with contact records may be restricted to small file sizes. For example, the maximum sub-image file size may be set to 3 kB in one embodiment.

If the resulting sub-image file size is less than or equal to the maximum sub-image file size, then the method 300 proceeds to step 310, wherein the image file is saved. The file may be saved in memory and/or as a part of the contact record. In some embodiments, it may be incorporated as an attachment to the contact record. The attachment of the sub-image file to the contact record may be performed by the image selector 62 following receipt of an encoding-complete message or signal from the image encoder 66.

If it is determined in step 308 that the sub-image file is of a size greater than the maximum sub-image file size, then the method 300 continues in steps 312 and 314. In step 314, the quality factor may be reduced by a predetermined increment. The sub-image is then re-encoded in step 306. By reducing the quality factor, the image undergoes greater compression in the encoding process, thereby resulting in a smaller file size. However, the quality factor cannot be reduced without degrading the image quality since it increased the size of the quantization steps. Accordingly, in step 312 a determination is made as to whether the quality factor has reached a predefined minimum quality factor. If not, then the quality factor is reduced in step 314 and the sub-image is re-encoded in step 306 and re-evaluated in step 308 for conformance to the size restrictions. If the quality factor has reached the defined minimum, then from step 312 the method 300 skips to step 310 to save the sub-image despite the excess file size. In one embodiment, the minimum quality factor is set to about 50 for JPEG compression on a 0 to 100 scale. Other settings may be used. The minimum quality factor may be defined in the configuration data 58.

It will be appreciated that the method 300 describes an iterative encoding process that attempts to incrementally increase image compression until the sub-image file is smaller than a maximum sub-image file size, although constrained by one or more limitations to ensure the image quality is not too severely degraded. Those skilled in the art will appreciate that some steps of the method 300 described may be performed concurrently or may be varied without significantly altering the process.

In an embodiment for loss-less encoding, such as GIF or PNG, the colour depth may be reduced in an attempt to reduce file size, instead of the quality factor. In other words, the number of colours—i.e. the size of the colour palette is reduced during the iterative adjustment process illustrated in steps 312 and 3145. Other parameters may also be adjusted, depending on the particular type of image encoding algorithm and format.

Figure 8:
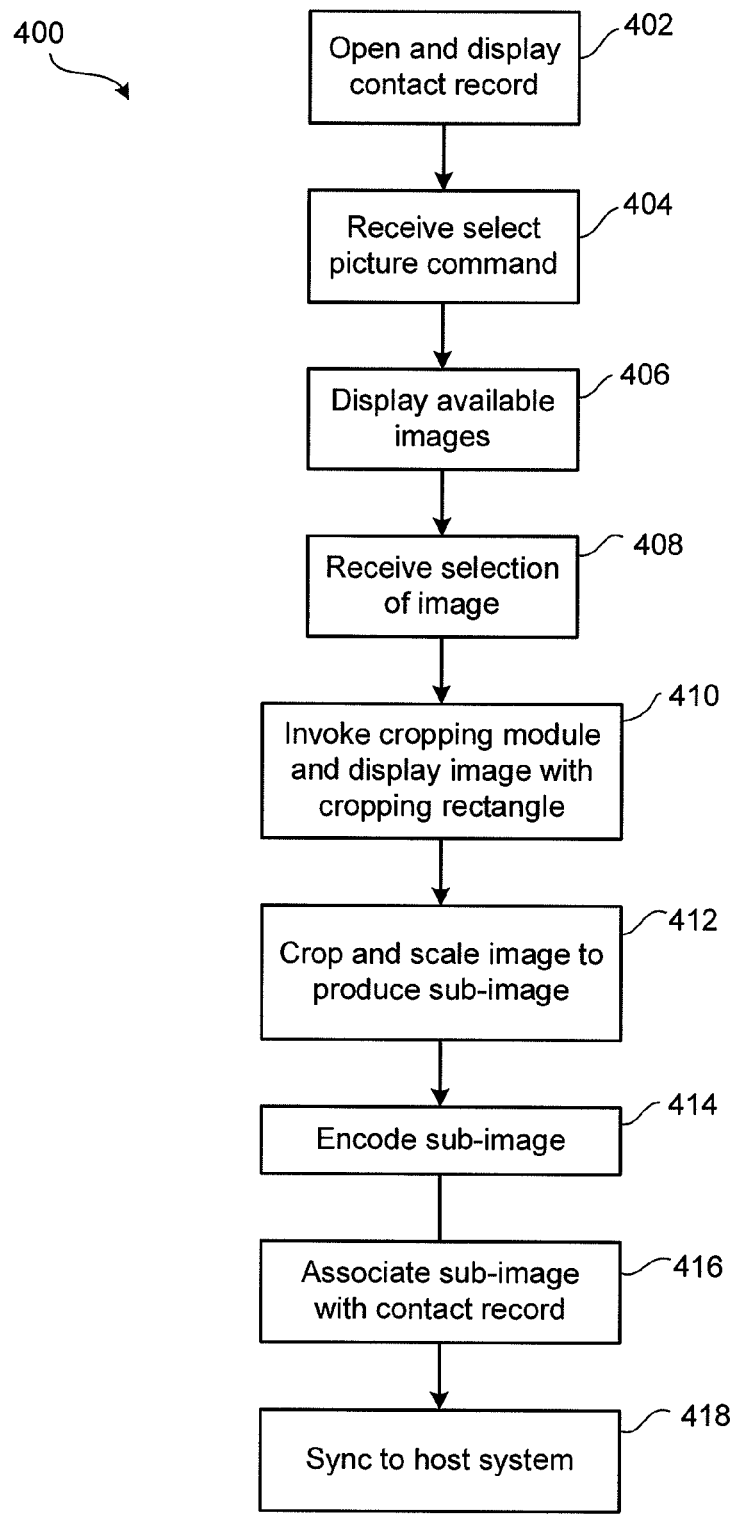
FIG. 8 shows, in flowchart form, an example method for selecting and associating an image with a contact record on a mobile device.

Reference is now made to FIG. 8, which shows, in flowchart form, an example method 400 of selecting and associating an image with a contact record on a mobile device. It will be noted that many of the steps of the method 400 have been partly or wholly described above.

The method 400 begins in step 402 with the display of a contact record on the display screen of the device. The contact record may be displayed by a contact editor. The contact may also be selected and displayed in the context of a communications application program, such as a voice call program or email program, as outlined above.

The device 10 then receives a user instruction in step 404 to add or select a picture for association with the contact record. This may include adding a new image field or changing an existing image associated with the contact record. As a result, in step 406 the device 10 displays the available images to the user. As discussed above, the display of available images may be in thumbnail format or in other formats. The user selects one of the images and, in step 408, the device 10 receives the user selection command.

The selected image is then displayed to the user via the cropping module 64 in step 410 and a cropping rectangle is overlaid on the image. The user may then manipulate the cropping rectangle, as discussed above, so as to select a desired portion of the image. The user may also zoom in or out of the image in order to obtain the desired portion. Once the user is satisfied with the portion of the image in the cropping rectangle, the device 10 receives a user crop command through an input device and, in step 412, it crops the image to obtain the sub-image. In step 412, the sub-image cropped from the image may also be scaled to meet predefined image size dimensions.

In step 414, the cropped and scaled sub-image is encoded. The encoding process may be similar to that described above in connection with FIG. 7. The encoded sub-image file may be stored to memory and/or within the contact record, as indicated in step 416. The contact record may include the sub-image file as an attachment.

In step 418, a synchronization operation is performed to pass the newly associated sub-image file to the host system 250 so that the host system 250 may update the corresponding contact record by adding the sub-image.

For convenience and ease of illustration, the image selector 62, cropping module 64, and image encoder 66 are shown as separate components or modules in FIG. 1. Moreover, the contact editor 56 is shown as being separate from the software applications 54 and/or the operation system 52. Those skilled in the art of computer programming will appreciate that, in some embodiments, the various components, modules, etc., discussed herein may be implemented individually or in combination using various programming constructs, including objects, modules, subroutines, etc., and that they may form a part of one or more of the software applications 54 and/or operating system 52.

Certain adaptations and modifications of the described embodiments can be made. Therefore, the above discussed embodiments are considered to be illustrative and not restrictive.

What is claimed is:

1. A computer-implemented method for encoding an image based on a maximum file size requirement, the method comprising:
   receiving a selection of a portion of the image;
   cropping the image according to the selection, to produce a sub-image;
   setting an encoding parameter;
   encoding the sub-image according to the encoding parameter to produce an encoded sub-image;
   determining that a file size of the sub-image file exceeds the maximum file size and that the encoding parameter does not meet a threshold and, in response, modifying the encoding parameter;
   repeating the encoding, the determining, and the modifying until the file size does not exceed the maximum file size or the encoding parameter meets the threshold; and
   saving the encoded sub-image.

2. The method according to claim 1 wherein the encoding parameter comprises any one of a quality factor, image dimensions and color depth.

3. The method according to claim 1 wherein the maximum file size is about 3 kilobytes.

4. The method according to claim 1 wherein encoding the sub-image comprises encoding the sub-image according to any one of JPEG, GIF and PNG image file formats.

5. The method according to claim 1 wherein setting an encoding parameter comprises setting a JPEG compression quality factor to about 75 on a scale of 0 to 100, wherein modifying the encoding parameter comprises decreasing the quality factor and wherein the encoding parameter meets the threshold when the quality factor is below about 50.

6. The method according to claim 5, comprising receiving configuration data from a host system before setting the quality factor, the configuration data containing any one of an initial encoding parameter, a threshold encoding parameter and a maximum file size.

7. A computing device for encoding an image based on a maximum file size requirement, the device comprising:
   a memory containing at least one image file containing image data for rendering an image; and a cropping module for receiving a selection of a portion of an image and cropping the image according to the selection, to produce a sub-image;

an image encoder for receiving selection of the sub-image and encoding the sub-image according to an encoding parameter to produce a sub-image file, wherein the image encoder is configured to incrementally modify the encoding parameter and re-encode the sub-image with the modified encoding parameter until a file size of the sub-image file exceeds the maximum file size or the encoding parameter meets a threshold and to save the encoded sub-image.

8. The computer implemented method according to claim 7 wherein the encoding parameter comprises any one of a quality factor, image dimensions and color depth.

9. The computing device according to claim 7 wherein the maximum file size is about 3 kilobytes.

10. The computing device according to claim 7 wherein the image encoder comprises any one of a JPEG, GIF and PNG image encoder.

11. The computing device according to claim 7 wherein the encoding parameter comprises a JPEG compression quality factor of about 75 on a scale of 0 to 100 and the threshold comprises about 50, and wherein the image encoder is configured to modify the encoding parameter by decreasing the encoding parameter.

12. A non-transitory machine-readable medium having encoded thereon computer-readable instructions executable by a processor, the computer-readable instructions for:
receiving a selection of a portion of an image;
cropping the image according to the selection, to produce a sub-image;
setting an encoding parameter;
encoding the sub-image according to the encoding parameter to produce an encoded sub-image;
determining that a file size of the sub-image file exceeds the maximum file size and that the encoding parameter does not meet a threshold and, in response, modifying the encoding parameter;
repeating the encoding, the determining, and the modifying until the file size does not exceed the maximum file size or the encoding parameter meets the threshold; and
saving the encoded sub-image.

13. The non-transitory machine-readable medium according to claim 12 wherein the encoding parameter comprises any one of a quality factor, image dimensions and color depth.

14. The non-transitory machine-readable medium according to claim 12 wherein the maximum file size is about 3 kilobytes.

15. The non-transitory machine-readable medium according to claim 12 wherein the instructions for encoding the sub-image comprise instructions for encoding the sub-image according to anyone of JPEG, GIF and PNG image file formats.

16. The non-transitory machine-readable medium according to claim 12 wherein the instructions for setting an encoding parameter comprise instructions for setting a JPEG compression quality factor to about 75 on a scale of 0 to 100, wherein modifying the encoding parameter comprises decreasing the quality factor and wherein the encoding parameter meets the threshold when the quality factor is below about 50.

* * * * *